Patented Dec. 14, 1937

2,102,179

UNITED STATES PATENT OFFICE 2,102,179

POLYMERIZATION PRODUCTS FROM STYRENE AND THEIR PRODUCTION

Heinrich Hopff, Ludwigshafen-on-the-Rhine, and Fritz Schmidt, Troisdorf, near Cologne, Germany, assignors to I. G. Farbenindustrie Aktiengesellschaft, Frankfort - on - the - Main, Germany No Drawing. Application June 9, 1936, Serial No. 84,302. In Germany June 19, 1935

5 Claims. (Cl. 260—2)

This invention relates to polymerization products from styrene and the production of the same.

We have found that polymerization products having especially high impact bending strength and stability to heat can be obtained by polymerizing styrene together with amounts of from 0.5 to 5 per cent of acrylic acid nitrile or methacrylic acid nitrile. These small amounts of the said nitriles increase the impact bending strength by about 100 per cent and the thermal stability according to Martens by about 10° to 15° C. as compared with polymerized styrene. The addition of larger amounts of the said nitriles causes a still further increase in the thermal stability but the impact bending strength falls again. Moreover the good electrical properties which the products having a low content of acrylic acid nitrile have are impaired by increasing the amount of nitrile. It is therefore preferable to select an acrylic nitrile content of the mixed polymerization product of only up to 5 per cent.

The preparation of the polymerization products may be carried out by the known polymerization methods, as for example by simple heating of the monomeric components with or without the addition of polymerization accelerators such as benzoyl peroxide. The polymerization may also advantageously be carried out in aqueous emulsion in the presence or absence of wetting or dispersing agents having an action similar to soap or even of protective colloids.

In addition to increased thermal stability and impact bending strength, shaped articles prepared for example by the injection-moulding process from the said polymerization products from styrene and acrylic or methacrylic acid nitriles have the further advantage that metal parts, such as screws and the like, embedded therein do not tend to break out after storage for long periods.

The following examples will further illustrate how this invention may be carried out in practice but the invention is not restricted to these examples. The parts are by weight.

Example 1

95 parts of styrene are mixed with 5 parts of acrylic acid nitrile and the mixture is heated to boiling until a solid mass has been formed. The temperature is then raised to 200° C. and kept thereat for 24 hours. The polymerization product thus obtained has an impact bending strength of about 30 cm. kg./cm.² and a thermal stability according to Martens of from about 70° to 75° C.

Example 2

A mixture of 97 parts of styrene and 3 parts of acrylic acid nitrile is polymerized in the manner described in Example 1. The resulting polymerization product has a thermal stability of 70° C. according to Martens and an impact bending strength of 28 cm. kg./cm.²

If the same amount of methacrylic acid nitrile be employed instead of acrylic acid nitrile, a product is obtained having a thermal stability of 72° C. according to Martens and an impact bending strength of 28 cm. kg./cm.²

Example 3

A mixture of 98 parts of styrene and 2 parts of acrylic acid nitrile is dispersed to a fine milk with 400 parts of a 2 per cent solution of alpha-hydroxy-octodecane sulphonic acid sodium salt by shaking or stirring. 2 parts of 30 per cent hydrogen peroxide are added and the whole heated at 60° C. until the polymerization is completed. A small amount of a saturated solution of common salt or aluminium sulphate is then added to the dispersion and the resulting precipitate is filtered off by suction, washed with water and dried at about 50° C. The polymerization product is thus obtained in the form of an extremely fine, snow-white powder. Injection-moulded test rods of this product show an impact bending strength of about 26 cm. kg./cm.² and a thermal stability according to Martens of about 70° C.

What we claim is:—

1. A process of producing polymerization products from styrene which comprises subjecting styrene together with from 0.5 to 5 per cent of a polymerizable aliphatic nitrile selected from the group consisting of acrylic acid nitrile and methacrylic acid nitrile to polymerization.

2. A process of producing polymerization products from styrene which comprises heating styrene together with from 0.5 to 5 per cent of a polymerizable aliphatic nitrile selected from the group consisting of acrylic acid nitrile and methacrylic acid nitrile.

3. A process of producing polymerization products from styrene which comprises heating styrene together with from 0.5 to 5 per cent of a polymerizable aliphatic nitrile selected from the group consisting of acrylic acid nitrile and methacrylic acid nitrile in the presence of polymerization accelerators.

4. A process of producing polymerization products from styrene which comprises heating styrene together with from 0.5 to 5 per cent of a polymerizable aliphatic nitrile selected from the group consisting of acrylic acid nitrile and methacrylic acid nitrile in an aqueous emulsion in the presence of polymerization accelerators.

5. Mixed polymerization products from styrene and from 0.5 to 5 per cent of an aliphatic nitrile selected from the group consisting of acrylic acid nitrile and methacrylic acid nitrile, said products possessing a higher impact bending strength and a higher stability to heat than corresponding polymerization products from styrene alone.

HEINRICH HOPFF.
FRITZ SCHMIDT.